Patented Feb. 12, 1924.

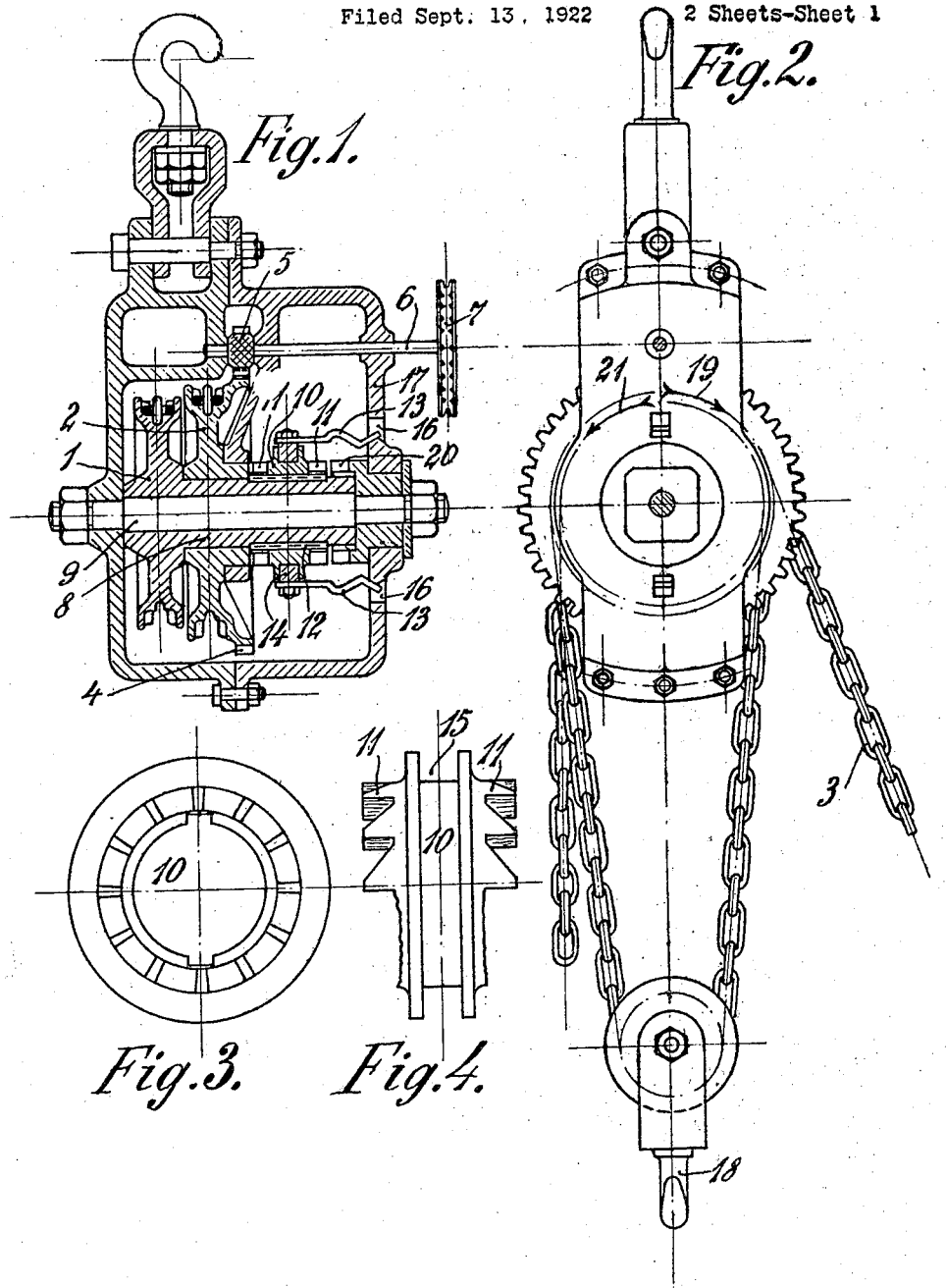

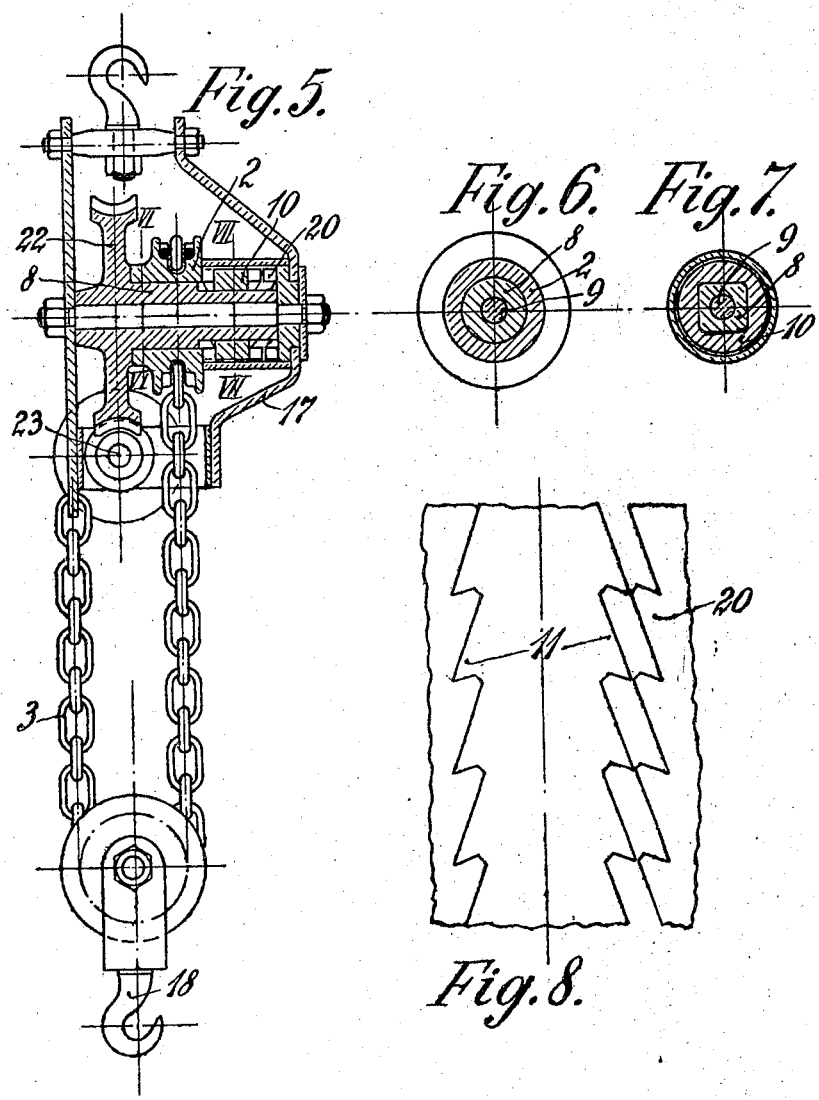

1,483,758

UNITED STATES PATENT OFFICE.

KARL TORP, OF CHRISTIANIA, NORWAY.

PULLEY BLOCK.

Application filed September 13, 1922. Serial No. 588,017.

*To all whom it may concern:*

Be it known that I, KARL TORP, a subject of the King of Norway, residing at Etterstad gate 27, Christiania, Norway, have invented certain new and useful Improvements in Pulley Blocks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to pulley blocks and has for its object to provide a pulley block, which may be used to lift a load with a large gear ratio wheel enabling the hook to be lowered again in an unloaded condition with a smaller gear ratio so that the lowering may take place rapidly.

The invention is particularly adapted for differential pulley blocks comprising two chain wheels with slightly different diameters, but may also be adapted for worm and worm wheel pulley blocks comprising a chain wheel driven by means of worm gear.

The invention comprises a coupling which is adapted in one position to connect one chain wheel with the other or with the worm wheel, while in its other position it connects one chain wheel or the worm wheel with the housing or frame of the pulley block leaving the other chain wheel free.

Further the invention comprises constructional details of the coupling which will appear from the following specification with reference to the accompanying drawings:

Fig. 1 is a vertical section through a differential pulley block in accordance with the invention.

Fig. 2 is a front view thereof.

Fig. 3 is a view on a larger scale of the coupling, and

Fig. 4 is a side view thereof with parts broken away.

Fig. 5 is a sectional view of a worm and worm gear pulley block in accordance with the invention.

Fig. 6 is a section on the line VI—VI on Fig. 5.

Fig. 7 is a section on the line VII—VII on Fig. 5.

Fig. 8 is a view showing part of the coupling teeth.

On the form of the invention illustrated on Figs. 1-4 1 and 2 are the differential chain wheels, over which there is run an endless chain 3 in the usual manner. Chain wheel 2 is provided with a gear 4 meshing with pinion 5, which is mounted on shaft 6 and may be rotated by means of an endless chain (not shown) engaging chain wheel 7.

Chain wheel 1 is integral with a sleeve 8 rotatably mounted on the stationary shaft 9. Chain wheel 2 is rotatably mounted on a part of sleeve 8.

On sleeve 8 is also mounted a coupling member 10 having coupling teeth 11 on both sides. Coupling member 10 is slidably mounted on sleeve 8 but is prevented from rotation thereon by means of key 12 or the like. Angularly bent springs 13 are fastened to a ring 14 rotatably mounted in groove 15 of coupling member 10 and cooperate with slots 16 in the endwall of the pulley housing 17 so as to maintain coupling member 10 in one of two extreme positions.

In the position illustrated on Fig. 1 the coupling teeth 11 on the left hand side of coupling member 10 engage corresponding coupling teeth on the right hand endface of chain wheel 2 and thereby connect chain wheel 2 with chain wheel 1 so that the pulley operates as an ordinary differential pulley block.

If the load on hook 18 is removed a rotation of chain wheel 2 in the direction indicated by arrow 19 will cause the coupling teeth on the said wheel to slide with their inclined surfaces on the corresponding surfaces of teeth 11 thereby pushing coupling member 10 towards the right out of engagement with chain wheel 2 and into engagement with corresponding stationary coupling teeth 20, thereby disengaging chain wheel 2 from chain wheel 1 and coupling chain wheel 1 to the housing 17, so that chain wheel 1 is then stationary.

In this position of the coupling member 10 the differential pulley block may be used as a simple chain wheel pulley block by operating chain wheel 2 by means of pinion 5.

If the load is again connected to hook 18 a pull exerted on chain wheel 1 in the direction indicated by arrow 21 will similarly move coupling member 10 back to its original position for operating the block as a differential pulley block.

In the embodiment of the invention illustrated in Figs. 5–8 a worm wheel 22 is substituted for chain wheel 1, said worm wheel being operated in the ordinary manner by means of worm 23.

Chain wheel 2 may be connected with sleeve 8 and thereby with worm wheel 22 by means of coupling member 10 in the same manner as above specified or disengaged therefrom in which case coupling member 10 connects sleeve 8 with the stationary housing 17.

Fig. 8 illustrates the cooperation of teeth 11 and teeth 20. The disengagement of chain wheel 2 is effected when hook 18 is unloaded by exerting a pull of the free end of chain 3 whereby the inclined surfaces of the coupling teeth provided on said chain wheel 2 will cause the necessary axial movement of coupling member 10.

A corresponding rotation of worm wheel 22 will cause the coupling member 10 to be brought back to its original position as illustrated in Fig. 5.

I claim:

1. In a pulley block the combination with a chain wheel, a sleeve connected with the hub thereof, a second chain wheel rotatably mounted on said sleeve, and adjustable coupling means for connecting or disconnecting the two wheels comprising a disk slidably and non-rotatably mounted on said sleeve.

2. In a pulley block the combination with a chain wheel, a sleeve connected with the hub thereof, a second chain wheel rotatably mounted on said sleeve, and adjustable coupling means for connecting or disconnecting said two wheels comprising a disk slidably and non-rotatably mounted on said sleeve and having teeth on one end surface and the first chain wheel having teeth engageable by the teeth of the disk.

3. In a pulley block the combination with a chain wheel, a sleeve connected with the hub thereof, a second chain wheel rotatably mounted on said sleeve, and adjustable coupling means for connecting or disconnecting said two wheels, and connecting one of the said wheels with a stationary part of the pulley block, said coupling means comprising a disk slidably and non-rotatably mounted on said sleeve and having teeth on both end surfaces and the first said chain wheel and the stationary part of the pulley block both having teeth engageable by the teeth of the disk.

4. In a pulley block the combination with a chain wheel, a sleeve connected with the hub thereof, a second chain wheel rotatably mounted on said sleeve, and adjustable coupling means for connecting or disconnecting said two wheels or for connecting or disconnecting one of said wheels to the stationary part of the pulley block, said coupling means comprising a disk slidably and non-rotatably mounted on said sleeve, and having teeth on both end surfaces, the first chain wheel and the stationary part of the pulley block also having teeth, and all of the teeth having inclined surfaces so that a coupling movement of said disk may be caused by the action of said inclined surfaces on each other.

In testimony that I claim the foregoing as my invention, I have signed my name in presence of two subscribing witnesses.

KARL TORP.

Witnesses:
MOGEUS BRIGG,
WAGNY SYVERSEN.